United States Patent
Khlifi

(10) Patent No.: US 12,459,435 B2
(45) Date of Patent: Nov. 4, 2025

(54) MOTOR VEHICLE

(71) Applicant: AUDI AG, Ingolstadt (DE)

(72) Inventor: Rachid Khlifi, Garching (DE)

(73) Assignee: AUDI AG, Ingolstadt (DE)

( * ) Notice: Subject to any disclaimer, the term of this patent is extended or adjusted under 35 U.S.C. 154(b) by 507 days.

(21) Appl. No.: 17/996,474

(22) PCT Filed: Mar. 5, 2021

(86) PCT No.: PCT/EP2021/055580
§ 371 (c)(1),
(2) Date: Oct. 18, 2022

(87) PCT Pub. No.: WO2021/228452
PCT Pub. Date: Nov. 18, 2021

(65) Prior Publication Data
US 2023/0202392 A1 Jun. 29, 2023

(30) Foreign Application Priority Data

May 14, 2020 (DE) ...................... 10 2020 113 162.3

(51) Int. Cl.
*B60R 1/08* (2006.01)
*B60J 3/00* (2006.01)
*G02B 5/20* (2006.01)

(52) U.S. Cl.
CPC ............... *B60R 1/083* (2013.01); *B60J 3/007* (2013.01); *G02B 5/208* (2013.01)

(58) Field of Classification Search
CPC . B60J 3/007; B60R 1/08; B60R 1/083; B60R 1/088; G02B 5/208; G02B 5/22;
(Continued)

(56) References Cited

U.S. PATENT DOCUMENTS 5,361,190 A * 11/1994 Roberts ..................... B60R 1/08
362/135
6,353,392 B1 3/2002 Schofield et al.
(Continued)

FOREIGN PATENT DOCUMENTS

CN 1942819 A 4/2007
CN 101954882 A 1/2011
(Continued)

OTHER PUBLICATIONS

International Preliminary Report on Patentability directed to International Application No. PCT/EP2021/055580, with English-language translation attached, issued Nov. 15, 2022; 10 pages.
(Continued)

*Primary Examiner* — Nathanael R Briggs
(74) *Attorney, Agent, or Firm* — Sterne, Kessler, Goldstein & Fox P.L.L.C.

(57) ABSTRACT

A motor vehicle having at least one rear-view mirror provided for use by the driver and having a reflecting mirror surface formed by a mirror material, in particular an interior mirror and/or an exterior mirror, and/or at least one passenger compartment window, in particular a windshield and/or a rear window and/or at least one side window, comprising a window material, in particular glass; the at least one rear-view mirror and/or the at least one passenger compartment window comprising a filter medium which absorbs light within at least one wavelength range and/or, in the case of the rear-view mirror, which reflects said light in a different direction from light outside the wavelength range.

8 Claims, 1 Drawing Sheet

(58) Field of Classification Search
CPC . G02B 5/26; G02B 5/28; G02B 5/281; G02B 5/283
See application file for complete search history.

(56) References Cited

U.S. PATENT DOCUMENTS

| | | |
|---|---|---|
| 2006/0221452 A1 | 10/2006 | Chen |
| 2011/0013301 A1 | 1/2011 | Uematsu et al. |
| 2013/0148063 A1 | 6/2013 | Maeda |
| 2017/0242272 A1* | 8/2017 | Tillotson ................. A61F 9/022 |
| 2018/0163460 A1* | 6/2018 | Lin ..................... G02F 1/13475 |
| 2018/0284268 A1 | 10/2018 | McWhirter |
| 2020/0041701 A1 | 2/2020 | Zhou et al. |

FOREIGN PATENT DOCUMENTS

| | | |
|---|---|---|
| CN | 205468446 U | 8/2016 |
| CN | 108663867 A | 10/2018 |
| CN | 110228236 A | 9/2019 |
| DE | 102007009013 A1 | 8/2008 |
| DE | 102017109550 A1 | 11/2018 |
| JP | 2017222540 A | 12/2017 |
| WO | WO 2008135268 A1 | 11/2008 |
| WO | WO 2013034236 A1 | 3/2013 |

OTHER PUBLICATIONS

International Search Report of the International Searching Authority directed to related International Application No. PCT/EP2021/055580, with English-language translation attached, mailed on Jun. 17, 2021; 5 pages.

\* cited by examiner

MOTOR VEHICLE

TECHNICAL FIELD

The present disclosure relates to a motor vehicle, having at least one rear-view mirror provided for use by the driver comprising a reflecting mirror surface formed by a mirror material, in particular an interior mirror and/or an exterior mirror, and/or at least one passenger compartment window, in particular a windshield and/or a rear window and/or at least one side window.

BACKGROUND

For example, in motor vehicles the requirements and needs with regard to the environmental sensors of motor vehicles increase due to the increase in automated functions, in particular for at least partially automatic vehicle guidance. An environmental sensor concept that is often proposed for modern motor vehicles is LiDAR. LiDAR uses light, particularly in the near-infrared range, for example in the wavelength range from 900 nm to 1550 nm, to measure objects in the region surrounding the motor vehicle, the emission of light pulses and the reception of the reflected light pulses also making it possible to measure distances. The detection range of LiDAR sensors in motor vehicles correlates directly with the power used for the emitted light, because today ranges of 300 m or more, for example, are desired. However, there are limitations to the power of LiDAR sensors in terms of human safety, particularly eye safety. This is because at extremely high power, electromagnetic waves in the wavelength range from 900 nm to 1550 nm could cause damage. Therefore, certain regulations are provided nowadays, so that, for example, the LiDAR sensors are provided with certain protection classes and approved. LiDAR sensor controllers use control mechanisms to continuously monitor output power.

Nevertheless, on the one hand, there is a desire for higher power levels to be used, and on the other hand, despite basic eye safety, LiDAR radiation can lead to restrictions in comfort, for example, perception effects can occur despite the use of light outside the visible range.

Furthermore, laser measuring devices for speeds of motor vehicles have also already been proposed in the prior art, for example in order to carry out traffic controls. Such laser speed measuring devices can be designed as laser pistols, for example. In these cases, too, laser light in the non-visible infrared or near-infrared range is often used, which can lead to problems comparable to those with LiDAR sensors, in particular a limitation in performance and the risk of loss of comfort for drivers.

US 2013/0 148 063 A1 relates to a reflective device in which the reflectivity can be adjusted automatically or manually. In particular, a mirror arrangement having a dimming function is proposed.

US 2017/0 242 272 A1 relates to a system and a method for protecting eyes against laser light. An eyeglasses-like eye protection system having two lenses and a lens carrier is proposed, wherein the first lens filters light of one or more first wavelengths, and the second lens filters light of one or more second wavelengths.

BRIEF DESCRIPTION OF DRAWINGS

The accompanying drawings, which are incorporated herein and form a part of the specification, illustrate the embodiments of the present disclosure, and together with the description, further serve to explain the principles of the embodiments and enable a person skilled in the pertinent art to make and use the embodiments, individually, or as a combination thereof.

DETAILED DESCRIPTION

Figure 1:
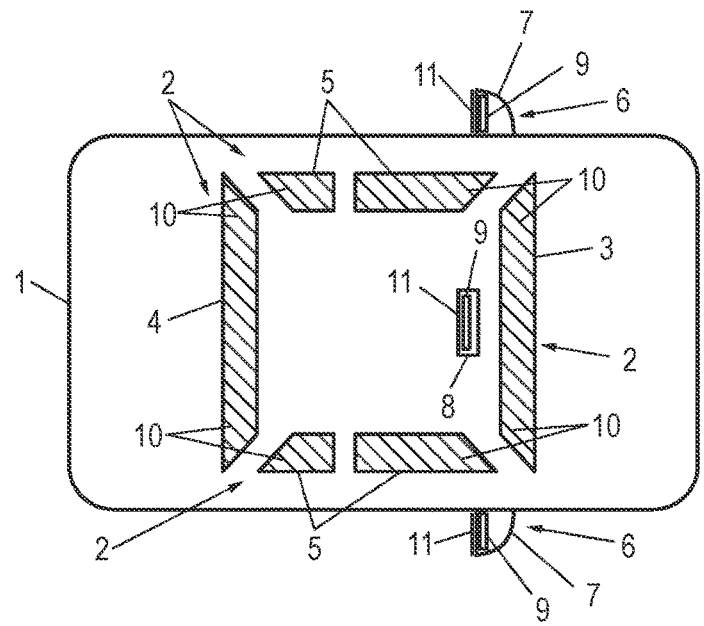
FIG. 1 is a schematic diagram of a motor vehicle, according to an embodiment.

The object of the present disclosure is to provide an embodiment of a motor vehicle that increases the eye comfort for occupants and, in particular, also provides the basis for higher performance with LiDAR sensors and/or laser measuring devices.

To achieve this object, it is provided in a motor vehicle of the type mentioned at the outset that the at least one rear-view mirror and/or the at least one passenger compartment window comprises a filter means that absorbs light within at least one wavelength range and/or, in the case of the rear-view mirror, reflects said light in a different direction than light outside the wavelength range.

In this case, the filter means can in particular comprise an absorption filter means and/or a dichroic filter means and/or an interference filter means. Absorption filters are designed to absorb light in the wavelength range and convert it into internal energy, such as heat. Another variant is constituted by photochromic materials, which undergo a reversible transformation by absorbing electromagnetic radiation. A dichroic filter, on the other hand, reflects unwanted wavelengths and allows the desired part of the spectrum to pass through. A dichroic filter can be created, for example, by a succession of one or more thin layers of different materials having different refractive indices. Finally, interference filter means are also conceivable which use the effect of interference to filter light depending on frequency.

The filter means may comprise a filter material incorporated into the mirror material and/or a window material, which can in particular also be incorporated as a layer. Furthermore, it is conceivable that the filter means comprises a filter layer, in particular a filter foil, arranged outside of the mirror material.

According to an embodiment, it is therefore proposed to provide at least one rearview mirror, preferably all rearview mirrors, i.e., exterior and interior mirrors, and/or at least one passenger compartment window with a filter medium, in particular a filter material and/or a filter layer, which absorbs electromagnetic radiation in a specific wavelength range and/or, in particular in the case of at least one passenger compartment window, reflects it away. In this way, a protective and comfort-enhancing function of the rearview mirror and/or passenger compartment windows is provided, in particular with regard to light that may be disruptive and, in particular, light that is not in the visible range.

It can be provided in particular that, in particular for the at least one rear view mirror, at least one of the at least one wavelength ranges is in the near infrared range and/or in the infrared range and/or is a wavelength range used by LiDAR sensors. In this case, the wavelength range can, for example, lie within the entire range from 900 nm to 1550 nm or even encompass this entire range. For example, current pulse LiDAR sensors use wavelengths of 905 nm, while current FCMW LiDAR sensors, i.e., continuous wave LiDAR sensors, work in the wavelength range from 1350 nm to 1550 nm. Both such light-absorbing rear view mirrors and such light-absorbing or reflecting passenger compartment windows contribute to enhancing comfort and driver protection and may in some cases offer new design leeway due to the reduced penetration of the LiDAR radiation used to vehicle occupants.

Furthermore, an expedient development of the present disclosure can provide that, in particular for a reflective filter medium of the passenger compartment window, the at least one wavelength range comprises at least one laser wavelength. This can relate in particular to laser wavelengths of a laser speed measuring device, for example a laser pistol. It is quite conceivable, because such laser speed measuring devices often also work in the near infrared range and/or infrared range, to define a wavelength range and to tune the filter means to this wavelength range, which includes both wavelengths used by LiDAR sensors and laser wavelengths used by laser speed measuring devices.

In a specific embodiment of the present disclosure, it can be provided that, in the case of a windshield of the motor vehicle as the passenger compartment window, the laser wavelength is a laser wavelength used by a laser speed measuring device. In particular, all passenger compartment windows can also be provided with a filter medium, for example filter material, that absorbs or reflects the laser wavelength in order to greatly reduce the strength of the laser beams. In a windshield in particular, it is expedient to minimize the transparency or the penetration of the laser beams, because this is the main direction from which measurements are taken with a laser speed measuring device. In a specific embodiment, it can be provided, for example, that reflective filter material is used on the exterior surface of the windshield.

It should be pointed out once again that absorbent filter means are preferred for the rear-view mirrors, because the reflection, in particular with regard to other occupants of the motor vehicle, should be minimized as far as possible. The use of materials that reflect in other directions can be seen as expedient only for the exterior mirror. In particular, in a specific embodiment of the present disclosure, it can be provided that in at least one of the at least one rearview mirrors, in particular at least one exterior mirror, a material that is retroreflective in the wavelength range is used as the filter material of the filter means. In this configuration, laser beams and/or LiDAR signals, for example, are simply reflected back in their emission direction, while other light components, particularly those in the visible range, are reflected as desired further in the direction of the occupant, in particular the driver, to provide information. Such a retroreflective filter material can also be provided by nanoparticles and/or microparticles that act in a frequency-selective manner.

Figure 2:
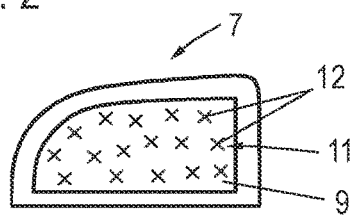
FIG. 2 is a schematic view of an exterior mirror, according to an embodiment.

Further advantages and details of the present disclosure shall become apparent from the embodiments described below and by means of the drawings, in which:

FIG. 1 is a schematic diagram of a motor vehicle according to an embodiment,

FIG. 2 is a schematic view of an exterior mirror, and

Figure 3:
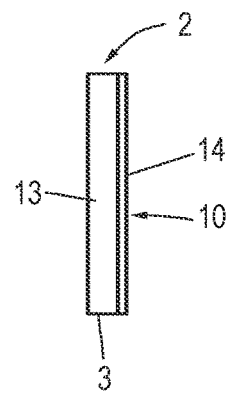
FIG. 3 is a schematic section through a windshield, according to an embodiment.

FIG. 3 is a schematic section through a windshield.

FIG. 1 shows a schematic diagram of a motor vehicle 1 according to the embodiment. In the present case, it has a windshield 3, a rear window 4 and four side windows 5 as passenger compartment windows 2. Furthermore, the motor vehicle 1 comprises two exterior mirrors 7 and one interior mirror 8 as rearview mirrors 6, each of which comprises a mirror material 9. In the present embodiment, all of the passenger compartment windows 2 and all of the rear-view mirrors 6 are provided with filter means 10, 11 related to a specific wavelength range, which are only indicated schematically, the filter means 10 of the passenger compartment windows 2 being hatched, for example.

In the present case, the filter means 10, 11 all relate to the wavelength range from 900 nm to 1550 nm, i.e., in the near-infrared range. The wavelength ranges used by LiDAR sensors and the laser wavelengths used by laser speed measuring devices are in this range.

The filter means 10, 11 can in principle comprise absorption filter means, dichroic filter means and/or interference filter means, wherein the filter means 11 in the present case are preferably absorption filter means, in particular for the interior mirror 8. As shown in FIG. 2, retroreflective materials 12 can also be used for the exterior mirrors 7 and can be embedded in the mirror material 9, but can also be provided as an outer layer. The retro-reflective material 12 reflects electromagnetic waves in the wavelength range back in the direction from which they arrived, while other light is reflected by the mirror material 9 as usual.

As already mentioned, a filter material can be integrated into the mirror material 9 for the rear-view mirror; however, layers applied to the outside are also possible, wherein these statements also apply to the passenger compartment windows. In this regard, FIG. 3 shows a schematic cross-sectional view of an passenger compartment window 2, in this case the windshield 3, which, in addition to the window material 13, comprises a filter layer 14 applied to the outside of the window material 13 as a filter means 10, which in the present case has a reflective effect and in this way significantly reduces electromagnetic radiation of the wavelength range that penetrates into the interior of the motor vehicle 1.

Such a configuration of the windshield 3 is extremely useful in particular with regard to laser speed measuring devices, for example laser pistols, because such measurements are usually taken from the front.

Nevertheless, it should be noted that within the scope of the present disclosure, filter means 10, 11 can also be used that relate to a wavelength range which includes wavelengths that are used for laser headlights of other road users, in order to achieve an enhancement in comfort in this regard.

The invention claimed is:

1. A motor vehicle comprising:
   at least one rear-view mirror configured for use by a driver, wherein the at least one rear-view mirror comprises a reflecting mirror surface formed by a mirror material, and wherein the at least one rear-view mirror includes at least one of an interior mirror, an exterior mirror, a passenger compartment window, a windshield, a rear window, or a side window;
   wherein the at least one rear-view mirror further comprises a window material, the window material being glass,
   wherein either the at least one rear-view mirror or the passenger compartment window comprises a filter that absorbs light comprising visible light and non-visible light within a wavelength range, or the at least one rear-view mirror reflects the light within the wavelength range in a different direction from the light outside the wavelength range, and
   wherein, within the wavelength range, the at least one rear-view mirror reflects the visible light in a direction of the driver and further reflects the non-visible light in a direction of the non-visible light being emitted.

2. The motor vehicle according to claim 1,
   wherein the filter comprises an absorption filter, a dichroic filter, or an interference filter.

3. The motor vehicle according to claim 1,
wherein the filter comprises a filter material incorporated as a layer in the mirror material or the window material.

4. The motor vehicle according to claim 1,
wherein the filter comprises a filter layer, and
wherein the filter layer is a filter foil arranged outside the mirror material or the window material.

5. The motor vehicle according to claim 1,
wherein the wavelength range is in a near infrared range, an infrared range, or is a wavelength range used by light detection and ranging (LiDAR) sensors.

6. The motor vehicle according to claim 1,
wherein the passenger compartment window comprises a reflective filter, and
wherein the wavelength range comprises at least one laser wavelength.

7. The motor vehicle according to claim 6,
wherein the passenger compartment window comprises the windshield, and
wherein the at least one laser wavelength includes a laser wavelength used by a laser speed measuring device.

8. The motor vehicle according to claim 1,
wherein the at least one rear-view mirror includes the exterior mirror, and
wherein the exterior mirror comprises a filter, the filter comprising filter material that is retroreflective in the wavelength range.

* * * * *